R. CREUZBAUR, DEC'D.
H. M. & C. CREUZBAUR & G. C. NICHOLS, EXECUTORS.
MOTOR.
APPLICATION FILED JULY 7, 1888.

1,037,842.

Patented Sept. 3, 1912.

Witnesses:

Inventor:
Robert Creuzbaur

UNITED STATES PATENT OFFICE.

ROBERT CREUZBAUR, OF NEW YORK, N. Y.; HELEN M. CREUZBAUR AND CARRIE CREUZBAUR, OF BROOKLYN, NEW YORK, AND GRACE C. NICHOLS, OF NEW YORK, N. Y., EXECUTORS OF SAID ROBERT CREUZBAUR, DECEASED.

MOTOR.

1,037,842.      Specification of Letters Patent.      Patented Sept. 3, 1912.

Application filed July 7, 1888. Serial No. 279,345.

*To all whom it may concern:*

Be it known that I, ROBERT CREUZBAUR, a citizen of the United States, residing in the city of New York, in the county of Kings and State of New York, have invented certain new and useful Improvements in Motors; and I do hereby declare the following to be a full, clear, and exact description of the invention, such as will enable others skilled in the art to which it pertains to make and use it, reference being had to the accompanying drawings, which form part of this specification.

My invention relates to that class of motors in which a constant mass of elastic fluid is alternately heated and cooled with corresponding increase and decrease of its pressure or volume or both during each cycle of the working piston motion, such different pressures acting constantly upon such piston without an intervening valve; no exhaust of such fluid taking place. The type of such motor is best illustrated by the Stirling air engine as patented by James Stirling and by Robert Stirling in 1816, 1827 and 1840. The main improvement herein described is this: In the said Stirling motor the elastic working medium used is shifted from the hot to the cool end of its containing vessel, and vice versa, by a reciprocating displacer. Whereas in the motor herein described the elastic medium such as air or steam, is so shifted by means of a rotating displacer, the motor being modified accordingly, thereby gaining great advantage.

I attain my object by the mechanism illustrated in the accompanying drawings in which—

Fig. 3 is a horizontal section along the line 3—3 Fig. 1. The Figs. 1 2 and 3 represent a motor for small power, in which the heating and cooling parts are made integral; whereas in the constructions represented by all the other figures, they are made separately with non-conducting packing between them. Fig. 6ª is a transverse section along the line 6ª—6ª Fig. 6. Fig. 8, is a vertical section at right angles to Fig. 6 along the line 8—8. Figs. 9, 10, 11 and 12 show details of the regulating vessel A, upon a scale double that of the last five figures; Fig. 9 being a partial cross-section along the line 9—9 Fig. 15, Fig. 10 a horizontal plan along the line 10—10 Fig. 11,—Fig. 11 a vertical section along the line 11—11 Fig. 10; and Fig. 12, a vertical central section along the line 12—12 Fig. 10. Figs. 15, 18, 20, 21 and 22 represent double acting motors in which steam is the only or the principal elastic working medium used, no water jackets being in that case required for the cooling parts.

Similar letters and figures refer to similar parts throughout the several views.

A is the regulating vessel, B, B' the chamber in which the elastic medium, generally air or steam, is heated and cooled, B being the heating part, and B' the cooling part.

C, C' are the rotating displacers, D is the power-piston and E its cylinder.

F is the gas burner-pipe.

G, G are pipes feeding heated air to the gas-burner.

H is the fire-gas, or exhaust or smoke-pipe; I is a jacket more or less surrounding the regulator A through which jacket the fire-gases can be made to pass, after having done their duty in the motor.

K is a lubricating-chamber under pressure.

L is a lagging, or air space or other non-conductor of heat.

M is asbestos or other packing obstructing the passage of heat.

Figure 1:
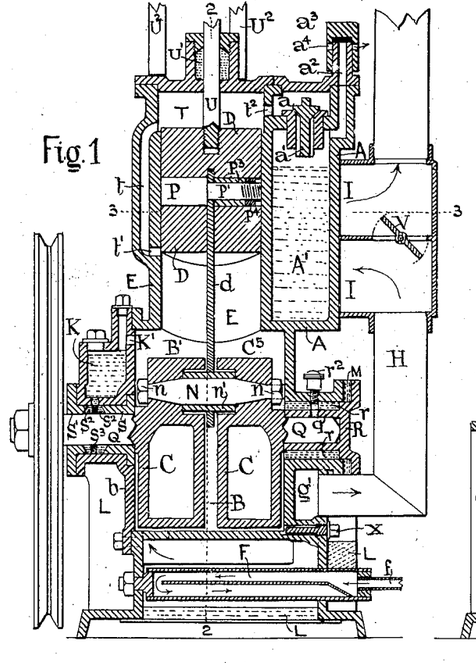
Figures 1 and 2 are vertical cross-sections at right angles to each other of a single acting motor, Fig. 1 centrally through Fig. 2, and Fig. 2 along the line 2—2 Fig. 1.
Figure 2:
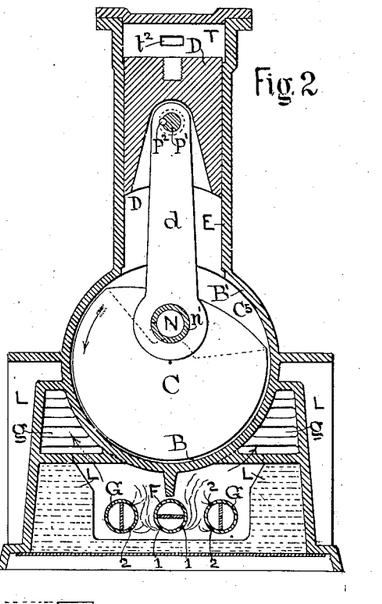
Figure 3:
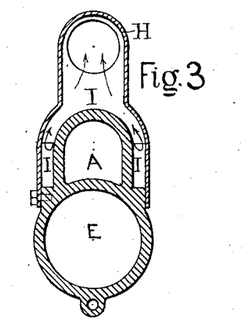

The motor represented by Figs. 1, 2 and 3, is single acting and of the simplest form. The chamber B, B' is a horizontal cylinder its upper cooling part B' being cast in one piece with its lower heating part B, the chamber being open on the left, closed by a cylinder cover $b$, upon which the lubricating-chamber K may be formed integrally. The chamber in this modification of my invention, as well as in the others herein referred to, corresponds in shape to the shape of the rotary displacer so that said displacer will act in relation to the chamber so as to cause the vapor to be heated in one part of the rotation and expanded in another whereby work may be done. The working-cylinder E opens directly into cylinder B, B' and may be cast in one piece with it, together with regulating chamber A. The piston D is made long enough to give guiding surface, and is arranged to travel close down to the path of the displacer C, which rotates in the heating and cooling-chamber B, B', its inner end-face being concave correspondingly so as to reduce the clearance between the piston and the displacer to a minimum. The displacers C, C' are cylinders, cut away at the periphery as shown at $C^5$, so as to form a space or pocket for the working air or steam. This cutting away of the periphery of the displacers may be done with a straight or concave contour, instead of the convex contour shown. In addition to the cutting away of the periphery, the ends may also be cut away as shown in Fig. 1 and dotted in Fig. 2, whereby the bulk of steam or air is exposed to a greater heating or cooling surface. If air or steam could be heated or cooled instantly, the center of the cut-away portion of the displacer, operating as indicated by the arrow, might in a single acting engine stand at the right Fig. 2, at right-angles to the connecting rod, the piston being at the upper end of its stroke as represented. But as it takes an appreciable time for the air to heat or cool, lead is given to the cut-away part $C^5$ of the displacer. The required lead of the displacer is from 60 to 70° for air and considerably less for steam, which, if saturated or cloudy, is far more rapid in taking up or surrendering heat. When the working-cylinder E opens directly into the chamber B, B' with direct connection between the piston D and the displacer by connecting rod $d$, the displacer has to be constructed in two parts C, C so that the parts C, C of the displacer are connected by crank pin N, and are rigidly kept apart at the proper distance, either by the end-taper of pin N as in Fig. 1 or by the shoulders upon the pin N as in Fig. 6, or by a separate sleeve surrounding pin N and forming such shoulders, not shown; such sleeve constituting the working-surface of the crank-pin, thus readily renewed. The two end-nuts $n$, $n$, keep the two pieces C, C, rigidly in place.

Figures 8, 9, 10, 11, 12:
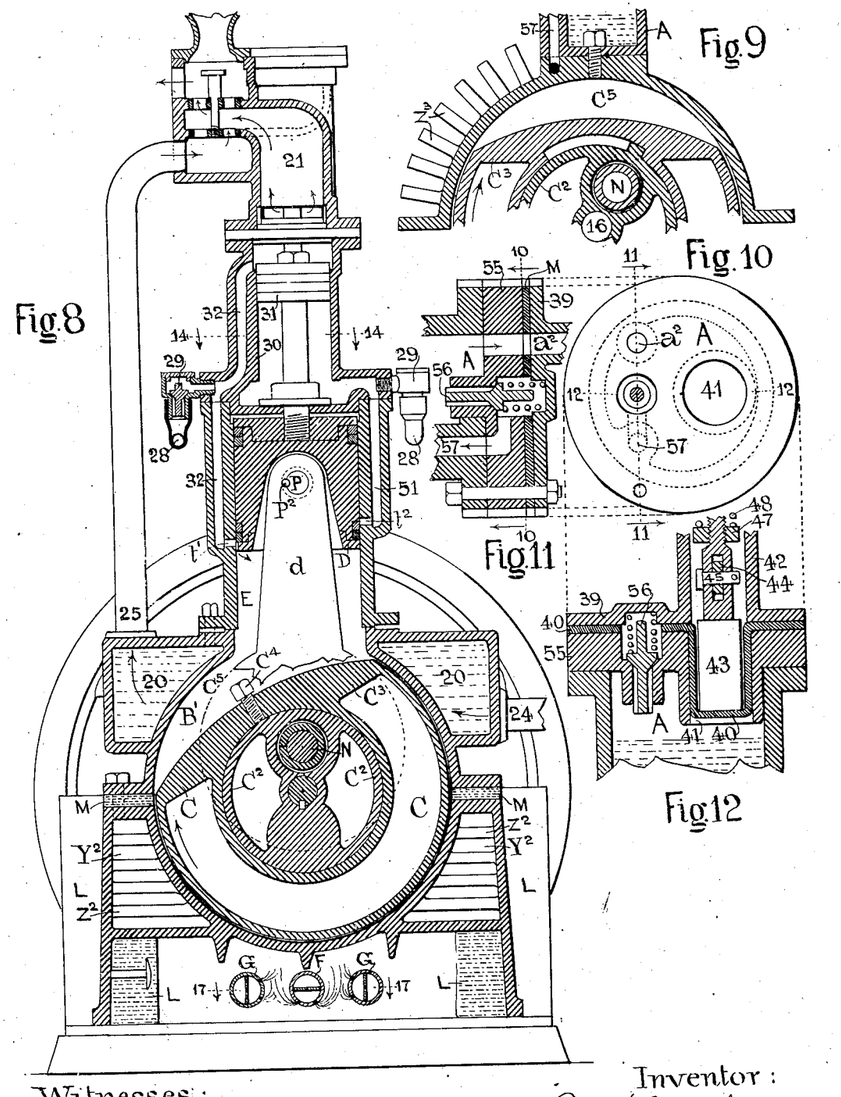

The sleeve $n^1$ has a free working fit upon pin N and is rigidly attached to the connecting rod $d$, by shrinking the latter upon the same. The sleeve $n^1$ may be split on one side as shown in Fig. 2, or on both sides, so that the wear may be taken up. The connecting rod $d$, is made thin, so as to reduce the dead space between the displacers C, C to the lowest practicable minimum, it being an important condition of such a motor, to avoid dead spaces,—wherein the elastic fluid lodges with little or no expansion or contraction, thereby reducing the effectiveness of the motor. For the same reason the connecting-rod $d$ is made wider than is necessary for strength as shown in Fig. 8, so as to reduce the space between the displacer-sections C, C left free by the rod, to the opening required for giving free passage for the air or steam to and from the piston. The lower part of the piston is slotted as shown in Fig. 2, to give free play for the oscillations of the rod $d$, the slot being preferably formed upon a chill in casting it. The connecting-rod $d$ is rigidly attached to wrist-pin P, P' which oscillates with it. This pin is made in three parts. Its left-hand end P has a due working fit in the piston, its right hand end, formed integral with it, is reduced to a core P' screw threaded upon the outer end. At the junction of P and P', the latter may be enlarged to form a square seat for rod $d$; or the rod-seat may be round, a key $P^2$ Figs. 2 and 8 confining the rod rigidly upon the pin. A sleeve $P^3$, of equal diameter and working surface with part P, abuts upon the rod $d$, and is firmly forced home upon the same by an annular nut $P^4$ of an outside diameter and finish equal to that of P and $P^3$. Otherwise the piston D may be formed and packed in any usual way.

In Fig. 1 each of the displacers C is cast integrally with a shaft end Q, which is admissible when the chamber B, B' is open at the end. The right shaft end Q works in a sleeve-box q, which may be separate or may in cheap machines be formed in one piece with end-cap R. To keep this journal cool, as well as partially to cut off the passage of heat from the shell of heating chamber B to the shell of the cooling-chamber B', a sleeve r, of heat obstructing material intervenes between box-sleeves q, and the outside bearing shell formed integrally with the heating and cooling shell of the chamber B, B¹. The left hand shaft end Q, upon which the fly and band wheel is mounted works in the loose inside bearing sleeve S and the other stuffing-box cap S¹, packing S², intervening. The shaft Q, Q is lubricated,—on the right in the usual way through a cup $r^2$, and on the left through lubricating fluid in the reservoir K communicating with B, B¹ through opening K¹, so that the pressure in chamber B B¹ is constantly acting upon the fluid in the reservoir K. This lubricating fluid is in contact with the porous packing S², and percolates through the same to the shaft. The common packing may be separated midway by a small coil of corrugated wire S³, which gives to the fluid a more free admission to the shaft. The pressure upon the lubricating fluid through opening K¹, prevents leakage of the elastic working fluid along the shaft, as the fluid in the wire-coil S³ is under the same pressure and effectually seals in the fluid in the motor, which has to force its way through the intervening packing diminishing its pressure, before it can reach the fluid in the wire coil, which is liquid. Furthermore it has been discovered that when lubricating oil is confined the friction is reduced considerably, a still better effect being produced by having it under pressure, as herein provided for and shown in Figs. 1 and 6. This sealing and lubricating fluid is prevented from escaping along the shaft by packing S² in Fig. 1, and packing K³ and S² in Fig. 6. The space T above piston D is a cushion-chamber which is in free communication with the cylinder-space under the piston, through channel t and port t' when the piston is at its extreme upward position, port t' being then uncovered, but at all other times covered by the piston.

Cushion-chamber T is in communication, through port $t^2$, with the upper part a of regulator A, a valve a' opening upwardly intervening between the upper chamber a and lower chamber A'. From chamber A' a channel $a^2$ leads upward into the open air; and when steam is used in the motor is covered by a weighted cap $a^3$, the weight of which together with the relative capacity of chamber T to the displacement of the piston regulates the pressure within the motor, the means for heating the motor being correspondingly proportioned and regulated as hereinafter described.

Figures 6, 6A, 7:
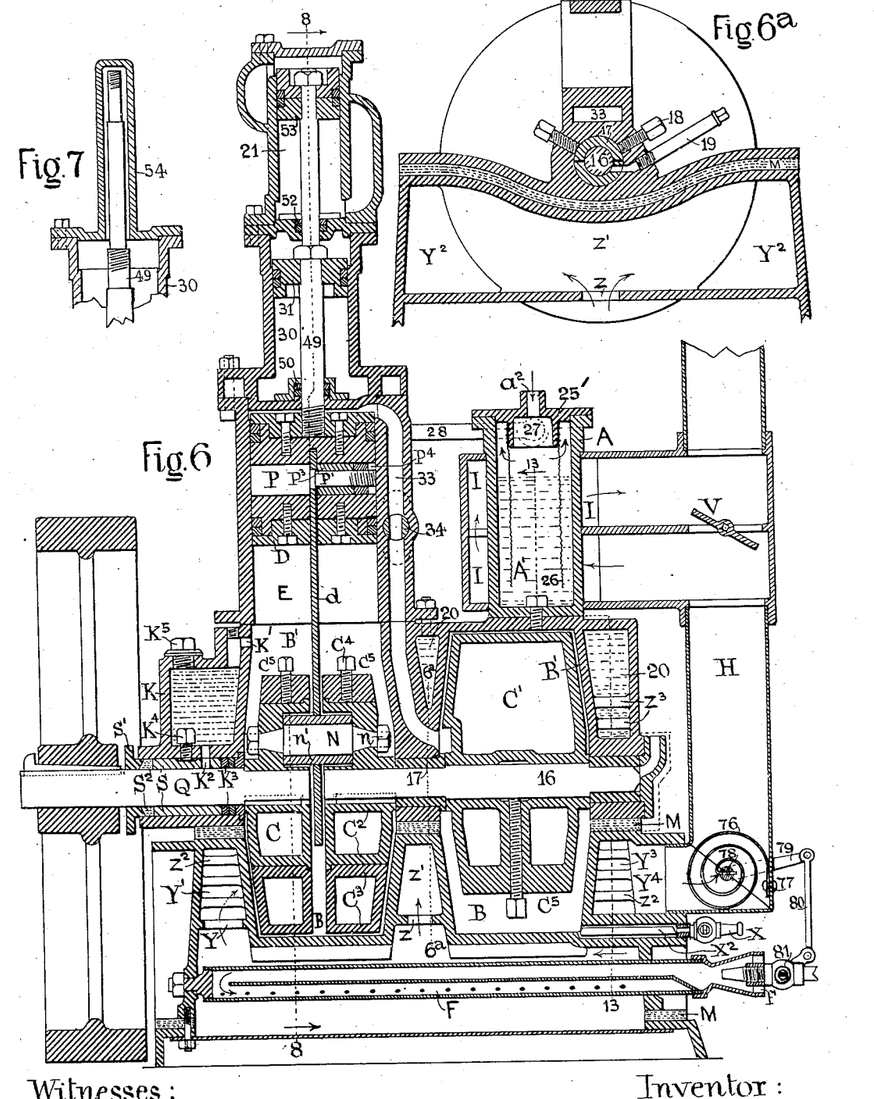
Fig. 6 is a vertical central section of another type of double acting motor driving a pump.
Fig. 7 represents a cap used in place of the pump, when the motor is doing other work.
Figures 15, 16, 17:
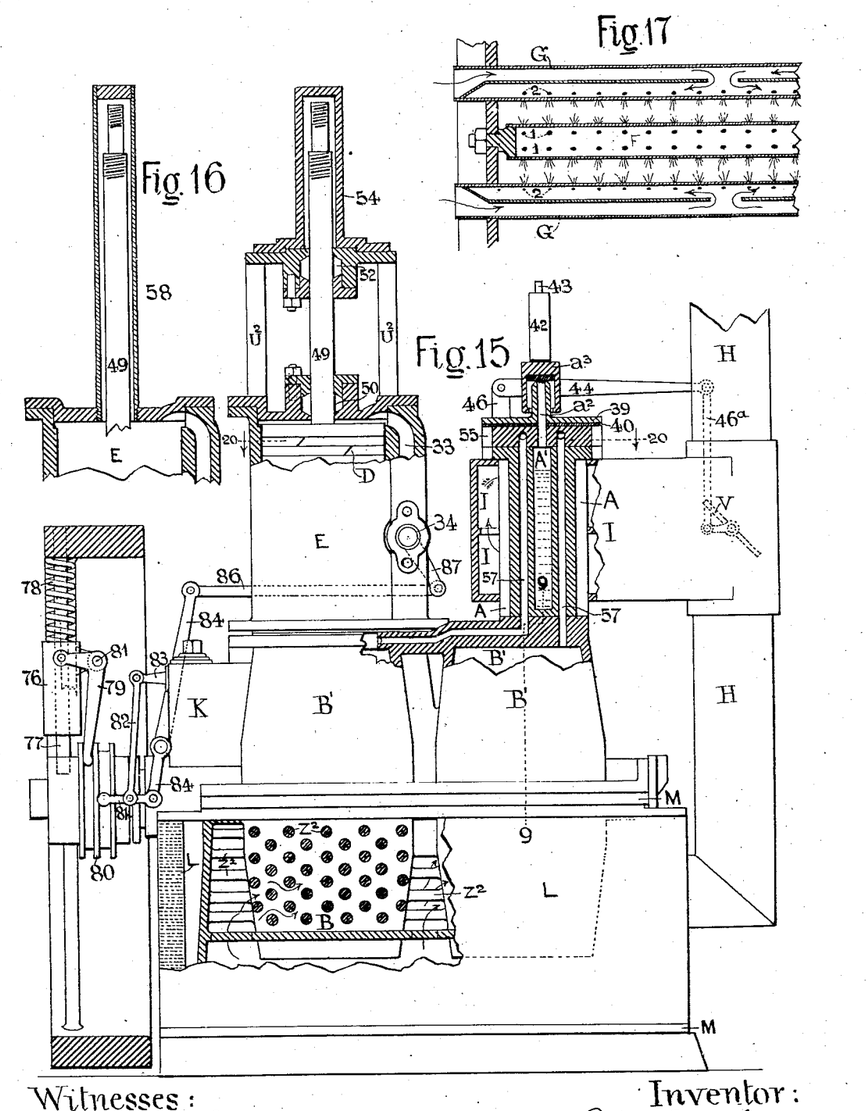
Fig. 15 is an elevation with front parts broken away to show part of the internal construction and partly in section, the regulator A being cut along the line 15—15 Fig. 20, showing its modification when used in a double acting motor and with steam as the working medium.
Fig. 16 is a cap to the working cylinder, used when no pump is attached.
Fig. 17 is a horizontal section along the line 17—17 Fig. 8 showing the construction of the gas burning device used, and of the tubes feeding air to the same.

U, Fig. 1 is a piston rod which, when the motor is used for pumping, passes out through stuffing box u' and connects directly with the pump piston as shown in Fig. 6, the pump being supported by three pillars U² Figs. 1 and 15. The regulator chamber A' is nearly surrounded by the jacket I Figs. 1 and 3, through which more or less escaped fire-gases are caused to pass, as indicated by the arrows, according to the position of the butterfly-valve V, which may be automatically governed as below described.

The motor is heated by gas, which enters through pipe f, into pipe F, the entrance being arranged as a Bunsen-burner, the suction through the central pipe f drawing air through the surrounding openings f' Fig. 6. This mixture of air and gas passes through the upper half of pipe F to its extreme end, where it enters the lower half of pipe F and issues out of a number of jet holes 1, 1 Figs. 2 and 17. The flames issuing from the jet-holes around pipe F, heat the gas therein on its way to the jet openings. The two air-pipes G, G take in air, preferably at both ends, as shown at one end in Fig. 17. This air passes along the outside halves of the pipes G as indicated by the arrows, becoming heated during its passage through the pipe. Near the center the air enters the inside halves of the pipes, as shown and issues at jet-holes 2, 2, mingling with the gas issuing at the oppositely placed gas-jet holes 1, 1 as shown in Fig. 17. Thus the flame is caused to more or less lap around the pipes, heating both the gas and the air before they issue from the pipes and igniting them in conjunction. The amount of gas entering the burner F may be automatically regulated, as below described. The amount of air feeding the flame, may be regulated in a similar manner. This motor Figs. 1, 2 and 3 is arranged for use with steam as the medium for producing the power and operates as follows. The chamber A' of the regulator A is filled with water through channel $a^2$ about to the height shown. The gas being admitted to burner F is ignited, the valve V is closed so that all the escape fire-gases are made to travel through the jacket I around the regulator A, so as to rapidly heat the water and produce steam corresponding to the weight of cap $a^3$, the motor acquiring the required temperature while the necessary steam is forming in the regulator A. The drainage plug X, to the right Fig. 1, at the bottom of the heating vessel B, being withdrawn, the air in the motor, heavier than steam, will there escape while the steam in A' forces its way through valve a' into the motor the piston being placed into its uppermost position. When air and condensed-water cease to issue through the drain-hole X, the water being preferably carried off by an inserted tube,—plug X is replaced. The working steam may be made more stable by retaining the air in chamber B, B', instead of allowing it to escape by the removal of drainage plug X. In such a case greater refrigeration can be applied to the cooling section B', and the refrigerating medium may be water, as with an engine worked with air *per se;* the temperature of the water being regulated to obtain the best results by controlling the amount of water passing over the cooling surfaces as below described, diminishing it to increase its temperature and vice versa.

The gas-flames pass to the left, Fig. 1 and rise as indicated by the arrows, through two openings dotted in Fig. 2, into the flues $g$, $g$, which are studded with heat-pegs, uniting in chamber $q'$ and escaping by smoke-pipe H. Thus far the steam in the motor is of the pressure corresponding to the weight of cap $a^3$ only. Motion being now given to the fly-wheel, the piston descends, closing port $t'$ and enlarging the space T, with corresponding lowering of the pressure therein. In consequence the valve $a'$ opens, and steam from space A' of the regulator enters space T, until equilibrium is established in A' and T. Assuming the pressure in chamber A' to be 18 lbs., that in chamber T being the same while the piston is in its lowest position, and assuming the displacement of the piston to be twice the capacity of space T when the piston is up the pressure in T will be nearly 3x18 or 54 lbs., just before $t'$ is uncovered by the piston. That post $t'$ being then uncovered, the steam in space T will rush into the space below the piston, thereby depleting the space T, so that during the next descent of the piston more steam will pass from space A' through valve $a'$ into space T; and so on, until the pressure under the piston, when in its uppermost position, is equal to the pressure above the piston at the time port $t'$ is uncovered by it, which under the above assumption would be 54 lbs. When the piston is in its uppermost position, it has just completed its working stroke, thereby depleting the steam under it of corresponding heat; and as the steam has then also expanded into its maximum space, the pressure under the piston is about that time at or near its minimum,—which in the case assumed would be 54 lbs. When the piston is down, the steam has been compressed into its minimum space, and has been heated by being hurled by centrifugal force against the lower hot surfaces; it therefore has then about its maximum pressure.

While the minimum pressure under the piston remains at 54 lbs. the steam in space T above the piston will rise and fall between 54x18 lbs., without delivering any steam through port $t'$ and without receiving any from space A'. But as soon as the minimum pressure below the piston falls below about 54 lbs., steam will again pass through space T as described. Instead of a port $t'$, covered and uncovered by the piston, a valve may be placed at any point in a channel $t$ leading from the space above the piston to the space below the piston such valve opening toward the latter space, as shown and described in my Patent Number 623,137, dated April 18, 1899. When the pressure in chamber A' rises above that corresponding to the weight of cap $a^3$, the latter will rise until the steam finds vent through the lateral small ports $a^4$ therein. This motor Figs. 1, 2, and 3, on account of the resistance of the air or steam in chamber T, requires an abnormally heavy flywheel. This may be obviated by converting such a motor into a double-acting machine, as here below described, in various forms. This single acting motor may be operated for small power and particularly with air, without regulator A, and with the space T above the piston open to the atmosphere.

Figure 4:
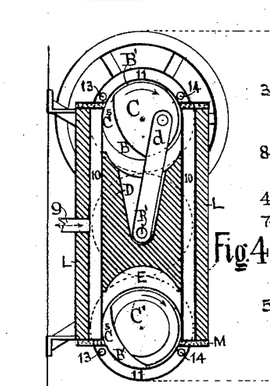
Figs. 4 and 5 are nearly central sections at right angles to each other, representing one type of a double motor.
Figure 5:
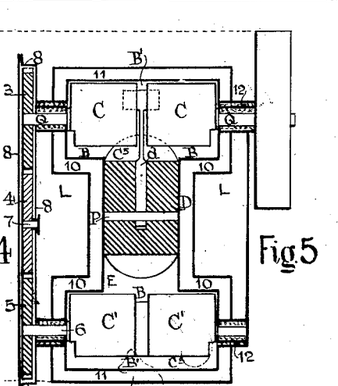

Figs. 4 and 5 represent a double acting motor with rotating displacers, which may be bracketed to a wall, with its working cylinder in a vertical position, or bolted to the floor, with the cylinder in a horizontal position; the two figures being central sections at right angles to each other. The piston D is coupled to the divided displacer C, C, as above described with reference to Figs. 1 and 2. The oppositely located displacer C', C' receives motion from shaft Q, through three gear-wheels 3, 4, and 5 the wheel 3 being keyed to shaft Q, and the wheel 5 to shaft 6, fixedly attached to displacer C', the middle wheel 4 revolving upon a stationary stud 7. These gear wheels are inclosed by the casing 8. This motor is represented as being heated by steam entering through pipe 13. The condense water may escape through the pipe 9 if the motor is a small one and located horizontally. Otherwise a special outlet for the condense-water is provided (not shown). Steam being the heating medium, it has to be at a high pressure to obtain a high temperature of the same in case the steam is also the working medium used with the motor. When bisulfid of carbon, or any other suitable substance of low boiling point is used as the working medium of the motor, exhaust steam from some other engine; or steam at a low or atmospheric pressure may be used as a medium for heating the motor; the direct application of a coal-fire being impracticable for heating bisulfid of carbon and similar vapor forming substances of low boiling points. Such heating steam surrounds the central heating part of the motor, occupying jacket 10, which is insulated from the cooling parts 11, 11, located on opposite ends, by insulating packing 12. If air is the medium used with the motor, with a gas or coal furnace to heat its central part or jacket 10, water would be circulated through the end-jackets 11, 11, entering at 13 and escaping at 14. Either the inlet 13 or the outlet 14 is provided with a cock adapted to control the amount of water passing through the jacket 11, a reduction of the flow increasing the temperature of the water in the jacket or vice versa. If steam or other condensable vapors are used as the medium within the motor, the jacket 11, 11, may be omitted the corresponding cooling ends being more or less exposed to the atmosphere. The gear wheels 3, 4, 5, may be omitted, by coupling the displacer C′ to the piston D, by a connecting rod $d$; the displacer C′ being in that case also made in two parts. But this construction is faulty in so far as such connecting-rod may stick upon the dead point, or turn in the wrong direction, locking the motor.

Figs. 6 to 14 inclusive represent a double acting motor, specially arranged as an air-motor, but also applicable as a steam-motor. The modifications applied to this motor, as compared to Figs. 1, 2, 3 are as follows: There are two cooling and heating chambers B, B′ the two heating parts B, B thereof being cast in one piece, and the two cooling parts B′, B′ thereof being cast in one piece; the two pieces being separated by asbestos packing M. The working cylinder E is placed over one of these chambers B, B′ in this case over the left hand chamber. There are two corresponding displacers the left one being formed in two parts as described, to admit of the passage of the rod $d$, which couples it to the piston D; and the right one in one piece clamped by a set screw, as shown, upon the shaft 16, upon which shaft the nearest half of the left hand displacer is fixedly keyed, the cut away portions $C^5$ of the two displacers being 180° from each other. Between the two displacers the shaft 16 passes through bearing box 17, preferably in two halves Fig. 6ᵃ, adjusted for wear by set screws 18. The raised collar upon box 17 abuts endwise against the casting, thereby obstructing leakage. This journal is oiled through a tube 19 screwed into the casting, with a passage for the oil to the shaft as shown in Fig. 6ᵃ. The lubricating fluid in chamber K, under pressure through port K′ as named, flows to the shaft Q through opening $K^2$, and is confined within the split bearing box S, on the inside by the metal-packing rings $K^3$ and on the outside by packing $S^2$ confined by gland S′. Wear in the box S is taken up by the set-screw $K^4$ accessible by the removal of cap-screw $K^5$. As the lead of the cut away parts $C^5$ of the displacers should not be the same with air and with steam the displacers are made rotatively adjustable with relation to the crank N. To this end each half of the left hand displacer is made in two concentric parts, one C next to the shaft, and the other being an annular piece $C^3$ movable rotatively upon the piece $C^2$, and clamped upon the same by a set-screw $C^4$. The cutaway portion $C^5$ upon the periphery of the displacer being upon this annular piece, its lead is thus made adjustable. The set-screw which confines the right hand displacer to the shaft, is a ready means for adjusting the lead of this displacer to correspond to that of the other, that is 180° therefrom. The displacers are preferably balanced in every direction, as shown in Figs. 6 and 8, and so that when adjustable for lead as described the core-piece $C^2$ is balanced within itself, and the annular piece $C^3$ is balanced within itself as shown in Fig. 8. These displacers may be formed as heavy as their perfect balance will allow so as to serve as a fly-wheel. When used as an air-motor, a water chamber 20, jacketing the cooling parts is necessary. Through this jacket the water passes on its way to the pump 21 Figs. 6 and 8.

Figure 13:
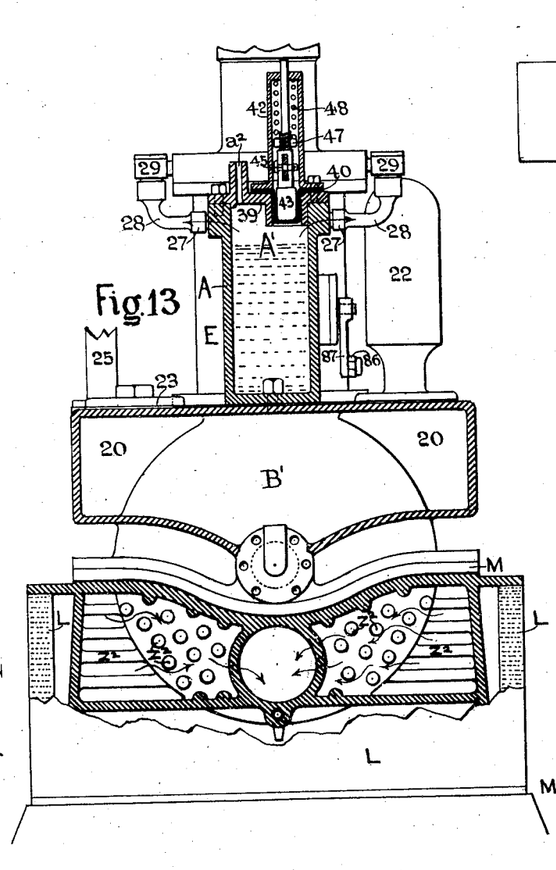
Fig. 13 is a vertical section of part of Fig. 6, along the line 13—13 looking in the direction indicated by the arrows, front parts being broken away to show the internal construction with a modification of the cover of the regulator A.
Figure 14:
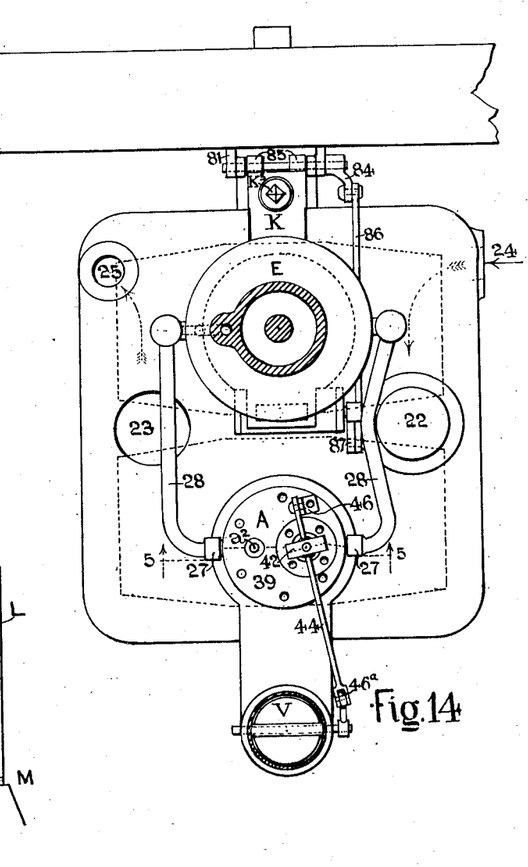
Fig. 14 is a horizontal section along the line 14—14 Fig. 8, and a plan view of the parts below that line. The motors represented by Figs. 6, 8, 13, and 14 are arranged with a water-jacket around the cooling parts, for use with air as the principal or as a large part of the elastic working medium.

Fig. 13 shows a transverse section of jacket 20, Fig. 14 showing a plan view of the same, 22 being an air chamber, 23 a hand hole, 24 the inlet of the water, and 25 the outlet leading to the pump 21. The course of the water may be reversed, passing through the jacket after passing through the pump. When used as a steam-motor no water passes through the jacket, and sufficient access is given for the passage of the outside air into the jacket to cool the parts sufficiently.

In Fig. 6 the regulator A is arranged for air as the medium used in the motor. Its cap 25′ is provided with an inlet $a^2$ through which water may be introduced into chamber A′, this water passing through an annular lip pending from the cover 25′, to which a fibrous or other curtain 26 is attached, so as to dip into the water, as shown. The entering air will consequently have to traverse this moist curtain 26, as indicated by the arrows, to reach the outlets 27, 27 from chamber A′, one of which outlets is dotted in Fig. 6, and both are shown in Figs. 13 and 14. From each outlet 27, the air passes through a tube 28 to a check-valve 29, the one on the left, Fig. 8, feeding into the working cylinder below the piston D, and the other above the piston D, as follows: In a double-acting motor the chamber above the working-piston D is not available for a pressure reinforcing chamber. Therefore an auxiliary air-compressing cylinder 30 and piston 31 are used. Assuming the minimum pressures above and below piston D to be 45 lbs., and the pressure in the space A' to be that of the atmosphere or about 15 lbs. and the air at that pressure to be compressed above and below piston 31 to 45 lbs., then: In the position of piston D shown in Fig. 8, the air above piston 31, of 45 lbs. pressure, is in communication, through channel 32 and port $t'$ just uncovered by piston D, with the air below the piston, then about at its minimum pressure, as explained with reference to Figs. 1, 2 and 3. If that pressure is below 45 lbs., air will flow from above piston 31 to below piston D. Upon the said pistons 31 and D having then reached their lower positions, the air above piston 31, thus depleted, will have a pressure below 15 lbs., causing valve 29 to open, and air to pass through it from the regulator-space A',— the port $t'$ being then covered by piston D. In the lower position of the pistons 31 and D, the latter will have uncovered port $t^2$. If the pressure above piston D is then below 45 lbs., air will pass from below piston 31 through channel 51, and through port $t^2$, to the cylinder-space above piston D; and so on. The purpose of the water in regulator space A' which moistens the air as named, is to give to the air greater capacity and rapidity for absorbing and rejecting heat and to increase its pressure at a given temperature. This effect can be increased by more or less heating the water in space A', by turning the fire-gases through jacket I, as above described.

Figure 21:
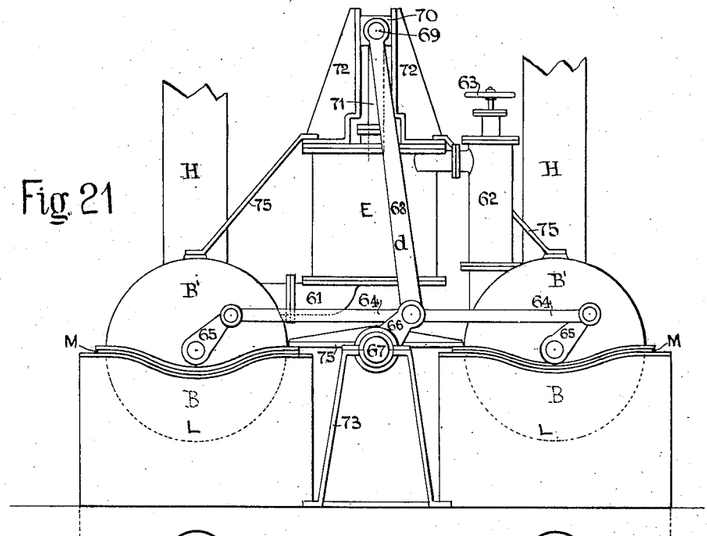
Fig. 21 is an end-elevation and Fig. 22 a plan of such a modified form of motor.

Channel 33 connects the working-space above piston D, with the right hand heating and cooling chamber B, B'. A cock 34 serves to regulate the speed of the motor, or to stop the same, by contracting or closing channel 33. For the purpose of keeping the bearings of the shaft cool, they are incorporated in the upper cooling casing B', the flanges of the upper and lower casings, and the intervening packing M, being for that purpose curved downwardly as shown in Figs. $6^a$, 13 and 21, whereby the heating surface is a little reduced. Each heating and cooling chamber B, B' is provided at its lowest point with a drainage cock X Fig. 6, or in place thereof and when used as a steam motor, with a steam-trap, any ordinary thermostatic trap being suitable.

The motor is represented as being heated by gas flame like Figs. 1 and 2. It may be heated by coal, a suitable furnace being substituted for the purpose; or in any other manner. The bulk of the heat passes to the left, and rises through opening Y Fig. 6 into the end flue Y', dividing therein into opposite directions and passing toward the right through the two side flues $Y^2$, $Y^2$ Fig. 8, into the end flue $Y^3$ Fig. 6, making their exit through the central outlet $Y^4$ into smoke-pipe H. Some of the heat passes from the burner F, through the central opening $z$, into central transverse flue Z' which opens at both ends into side flues $Y^2$, $Y^2$ Figs. 6 and $6^a$.

In Figs. 6, 8, 13, and 15, $z^2$ are heat-pegs traversing the flues, and connecting the walls forming the flues, whereby the heat transmitted to the outer-walls thereof and to the pegs, is carried to the inner walls and transmitted to the motor fluid. When used as a steam-motor, the cap 39, Fig. 13 is substituted for cap 25 Fig. 6, a weighted cover $a^3$, shown in Fig. 15, closing the opening $a^2$, as in Fig. 1. This cap 39 with its attachments is arranged so as to automatically control the pressure in chamber A', by causing that pressure to more or less close damper V Figs. 1, 6, and 15, as follows: A hat shaped rubber-packing 40 Fig. 13, closes the sleeve-like opening in the cap 39. The flange of the hat-packing 40 is confined between cap 39 and a flange formed upon the inverted U frame 42 as shown in Fig. 13. Or the cap 39 and the flange upon U frame may be merged into one piece, as shown in Fig. 12, wherein the rubber piece 40 packs the cap 39 also. The plunger 43 fits loosely into said hat-shaped packing 40, its upper end being guided in the upper end of the frame 42 as shown. A beam 44 Figs. 12, 14, 15 and 18, is fulcrumed in the slot formed in plunger 43, by a pin 45 the short end of the beam Figs. 14 and 15, being pivoted upon a stud 46 formed upon, or attached to cap 39, and the end of the long arm of beam 44 is pivoted by a pending rod $46^a$ Fig. 15 to a short arm formed upon the stem of valve V, as shown in Figs. 14 and 15. The plunger-stem 43 is screw threaded above its slotted part, upon which threads a nut 47 which may be screwed higher or lower. A spiral spring 48, which surrounds the plunger-stem, abuts, above against the end of frame 42, and below upon nut 47, thereby bearing the plunger downwardly with a force increased or decreased by screwing nut 47 up or down. Thus the pressure in chamber A' which acts against the rubber-cup 40 and the plunger 43,—when greater than the force of the spring 48 which bears down upon the plunger, causes the free end of beam 44 to rise accordingly, opening valve V wider, and thus allowing more of the furnace gases to pass straight up the smoke-pipe, H, instead of through jacket I; and vice versa.

Figures 18, 19, 20:
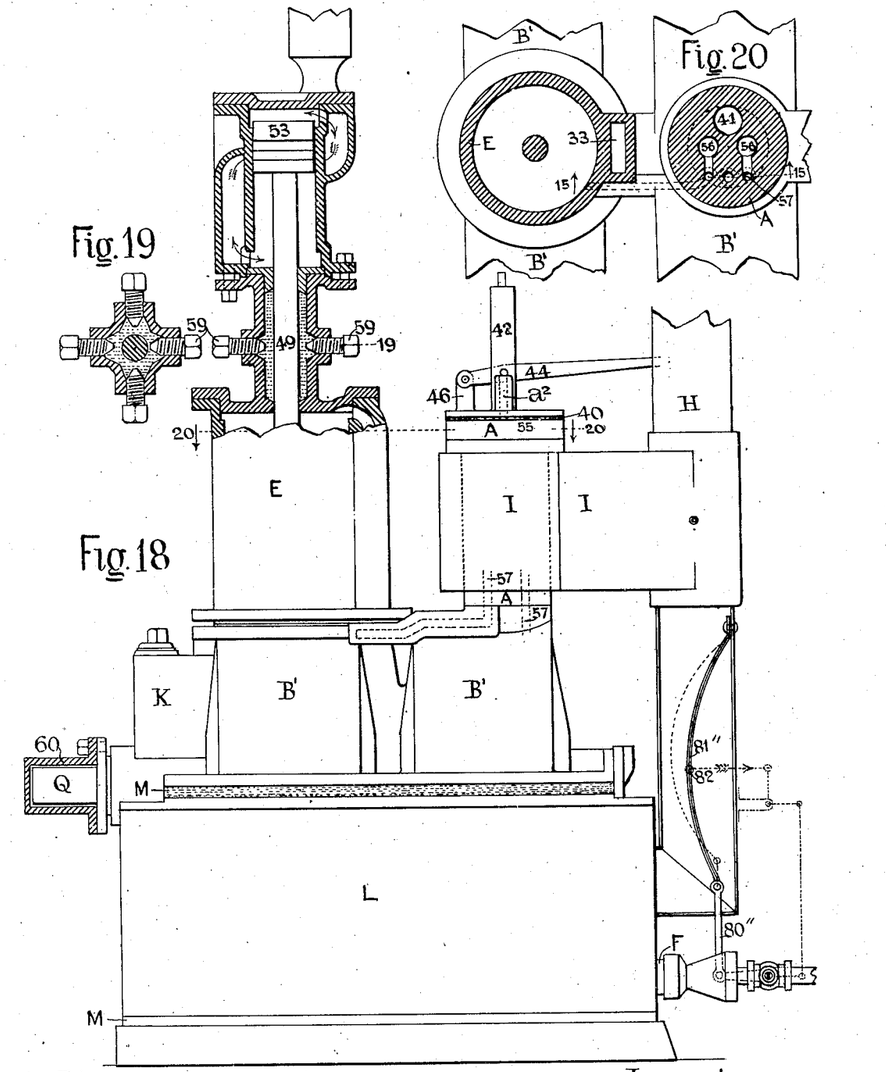
Fig. 18 is an elevation of a double acting steam motor driving a pump, with the pump and the stuffing box under it in section. In this figure the fly-wheel is removed, and a cap, shown in section, is attached over the end of the shaft, after the motor is set in motion.
Fig. 19 is a horizontal cross-section of the stuffing box Fig. 18.
Fig. 20 is a horizontal section along the line 20—20 Figs. 15 and 18.

In motors applied to varying power, the gas flame or furnace fire is regulated by the temperature of the escape fire-gases as represented in Fig. 6. There are various methods for causing a change in temperature to produce mechanical motion. I prefer the method shown. A thermostatic spring 76 in spiral form is fixed at one end in the flue H at 77 and its other end is fastened to the spindle 78, which is journaled so as to traverse the smoke-pipe as shown, and has an arm 79 affixed to it on the outside, from the end of which a link 80 connects to the handle of the gas-cock 81,—so that when the spindle 78 is revolved by the spiral 76, the gas-cock will be turned thereby reducing or increasing the amount of gas burned, as the case may require. If a coal furnace is used, the arm 79 would be coupled to the damper which controls the draft of the furnace. Instead of the thermostatic spring being coiled it may be designed as shown in Fig. 18, where the upper end of the double leaf-spring is fixed and the lower end is free to move vertically, and is attached by link 80'' to the gas-cock handle, an increase in temperature will cause the spring 82 to be moved into the shape shown in a dotted line, thereby drawing up its lower end, together with link 80'', with a corresponding movement of the gas cock. Or the movement may be taken from the central curved part of the spring 82 in the direction of the arrow, the lower end at the spring rising vertically. And other methods based upon the same principle may be applied—the circumstances governing the selection of the method used.

The piston-rod 49 Fig. 6, which is fixedly attached to the top of piston D, as shown, passes through stuffing-box 50, and carries air-piston 31, which then passes through stuffing-box 52, and carries the pump-piston 53. When no pump is used, the pump and its piston 53 are removed and the remaining piston-rod is housed by cap 54 Fig. 7, which takes the place of the pump-barrel and of the disk embodying stuffing-box 52.

Figs. 15 and 18 represent motors arranged principally with steam and other condensable vapors. The water jacket 20, and the air compressing-cylinder 30 Fig. 8, are omitted; and the steam formed in regulator. A is caused to pass directly into the cooling spaces B', B', omitting tubes 28, channels 32 and 51, and ports $t'$ and $t^2$ Figs. 8, 13 and 14, as follows: Between the cylinder A and its cap 39 there is intermediate cap 55, Figs. 11, 12, 15, wherein two check valves 56 are located, Figs. 11, 12 and 20 each of which connects with a channel 57 cast in the walls of chamber A, the right-hand channel 57 leading directly into cooling chamber B', on the right Fig. 15, and the left hand channel 57 leading as shown in Figs. 9 and 15 and dotted in Figs. 18 and 20, into the left chamber B'. In this case the pressure in chamber A' must be equal (barring the effect of the check-valve) to the desired minimum pressure in the chambers B, B'. Assuming the pressure in chamber A' to be 45 lbs., and the minimum pressure in the right-hand chamber B' to have fallen to 40 lbs. the other chamber B' remaining at 45 lbs., the right-hand valve 56 Figs. 12 and 20 will be forced open by the pressure in chamber A' under it, allowing steam from the latter to pass through the valve and through the right-hand channel 57 Fig. 15 into the chamber B'. The same action takes place with the left-hand valve 56 and its channel 57, whenever the pressure of the corresponding chamber B' falls below that of the regulating chamber A'.

Both Figs. 15 and 18 represent motors arranged for pumping water. In Fig. 15 the pump-barrel and its piston are removed, the piston-rod being housed by cap 54. The pump is supported by pillars $U^2$, $U^2$, so that the stuffing-boxes 50 and 52 are accessible. Both these stuffing-boxes may be omitted when the pump is not in use, by using cap 58 Fig. 16, which forms the cover for cylinder E, and houses the rod 49. In Fig. 18 two stuffing boxes 50 and 52 Fig. 15 are merged into one, wherein the packing is set up by four set-screws 59, which crowd the packing sidewise against each other, and lengthwise along the rod, as well as in the line of their advance, the shell of the box being tapered, as shown in Figs. 18 and 19, to facilitate the crowding of the packing in the directions named. The pumping machine, Fig. 18 is so arranged, that after the motor is set into motion by a starting bar clasping shaft Q, or by a temporary flywheel, the protruding end of shaft Q is capped by cap 60, whereby all leakage is avoided, dust excluded, interference prevented, and no moving part is visible. The regulator A may be a miniature boiler with its own fire, entirely separate from the motor, with connections to chamber B', B', controlled by check-valves as described.

Figure 22:
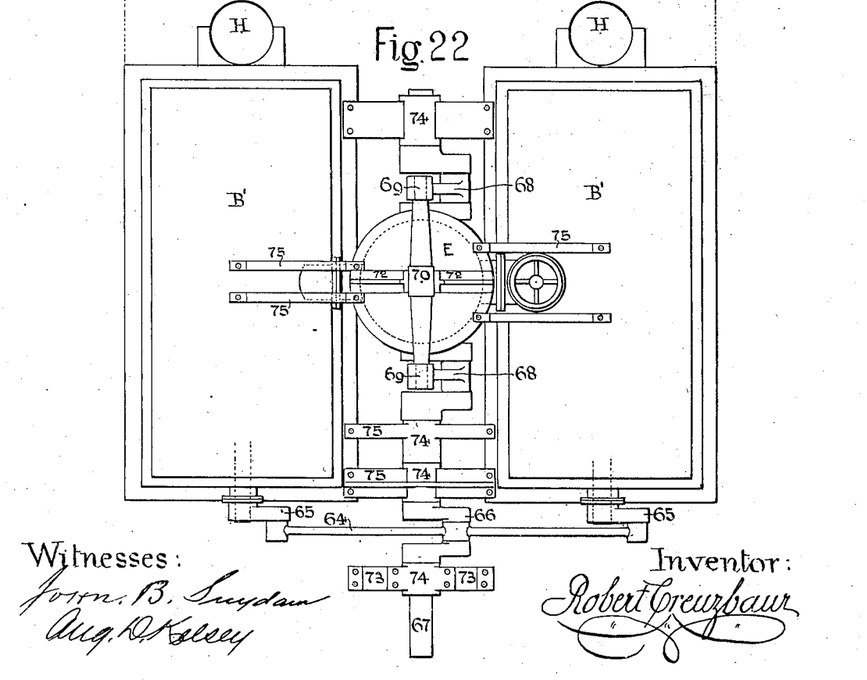

It is evident that the working cylinder E need not open directly into one of the heating and cooling chambers B, B'; but may be separately located with reference to said chamber and connected therewith by pipes the same as a common steam-engine is to its boilers; such connecting pipes in this motor being made as short as practicable to avoid unnecessary dead-spaces, wherein the fluid remains inactive. Such separate location of the cylinder is particularly applicable in motors of large power, wherein four or more heaters and coolers supply one working piston. Such a motor is represented in Figs. 21 and 22, wherein the left-hand vessel B' is connected to and feeds the lower end of a working-cylinder E by channel 61; and the right-hand vessel B' is connected to and feeds the upper end of cylinder E by channel 62, wherein a speed regulating valve is located controlled by hand-wheel 63. The displacers in the two vessels B, B' receive motion through rod 64, which couples their cranks 65, 65 with the engine-crank 66 upon the main shaft 67, this shaft receiving motion by the two return connecting rods, 68, 68,—69 being the wrist pins, 70 the cross head, 71 the piston-rod, and 72, 72 the cross-head guides. The guides may be preferably duplicated, one pair being placed close to each of the wrist-pins. 73 is a pillow-block, 74, 74 are shaft-bearings, and 75, 75 are braces. These heating and cooling vessels B, B' may be extended endwise, or several of them may be connected endwise; and they may be located two or more on each side of the cylinder E, the coupling-rod 64 in that case connecting four or more cranks 65 to the main crank 66. As to the power practically attainable, an estimate based upon well established data, shows that two heating and cooling drums seven feet in diameter and 15 feet long, will produce about 1460 horse power—four such drums producing nearly 3000 H. P.

As the displacers, like a piston of a usual steam-engine, are alternately exposed to both the heating and cooling surfaces during every revolution, it is preferable to coat them with a non-radiating and non-conducting surface such as enamel; or they may be coated with, or formed of "papier mâché" or other material serving that purpose. It is more important that the material or coating of the displacers be non-radiators of heat, than non-conductors, particularly as the centrifugal force imparted to the elastic fluid diminishes its pressure upon the displacer. A non-exhaust-motor of this nature presents great facilities for perfect lubrication, which is made more permanent and is preserved from caking and incrustations by mixing with the working fluid a lubricating material which is neutral to the fluid and unaffected by heat such as fine graphite, soap-stone, or flour of sulfur, according to the elastic motor-fluid used. The advantages of such a rotary displacer as compared to a reciprocating displacer are: Greater simplicity of mechanism. Greater facilities for housing and protecting the operating parts. A greater number of revolutions in a given time under equal conditions, which is largely favored by the centrifugal force imparted to the elastic fluid used by the revolving displacers, such force causing the fluid to strike the surfaces with corresponding impact, which greatly adds to the rapidity with which heat is absorbed and surrendered. Furthermore the displacers perform the additional duty of acting as fly-wheel. It is not a peremptory condition that the heating parts be below and the cooling parts above. But with a condensable working medium such as steam, it is preferable to arrange the relative location of the cold and hot parts as represented, so that the condense-water, when the motor is not in operation or at any time, will be drained into the part impinged upon by the fire with its consequent reëvaporation. The specific construction of such a nonexhaust motor depends upon the uses for which it is intended. If economy of fuel is the leading advantage sought, a minimum of outside refrigeration should be applied, the heat abstracted by the work done being principally, if not totally relied upon to produce the differences in pressures required to give action to the motor. The mean effective pressure of such a motor is comparatively small, and therefore its dimensions weight, and radiating surfaces large. If in such a motor, no heat is abstracted by water, its economical advantages over a common steam-engine, having outside radiation, would be the saving of all the latent heat of the steam usually escaping with the exhaust, except so far as it is utilized in heating the feed-water of the boiler. The net amount so lost is in the best engine about ⅝ of the total heat imparted by the boiler. On the other hand, if a minimum of size and weight is the main object, the means effective pressure should be raised by extracting heat from the working fluid externally as described to any practicable extent—such heat being of course lost, and the motor less economical accordingly.

The motor, if comparatively small, is reversed by mounting the annular section $C^3$ Fig. 9, upon the central section $C^2$ as a loose eccentric of an ordinary steam-engine is mounted upon a crank-shaft, as shown, the fly-wheel being turned in the new direction by hand or by a bar. Or the reversing may be done by belts in an ordinary way. Heat conveying pegs $Z^3$ Fig. 9, may also be incorporated in the cooling part, when air is the principal working medium used. They may be applied as shown in Fig. 9; or if the cooling part is covered by a jacket, such pegs would connect the two walls of the jacket as shown in Fig. 6.

The cock 34 located in the channel 33 leading from the right-hand fluid-chamber to the upper end of the cylinder E is automatically controlled by a usual speed governor located in the fly-wheel in the usual way; or as follows: Figs. 14 and 15 a weight 76' is loosely fitted upon radial rod 77', and is pressed down toward the hub of the fly-wheel by spring 78', the tension of which is such that it will yield with too great a speed. The radial motion of weight 76' is transmitted through double elbow lever 79' to the grooved sleeve 80' which turns in unison with the fly-wheel and is adapted to slide freely upon the hub of the same. Lever 79' is pivoted upon a bar 81' journaled in ears formed upon the two adjacent wheel spokes. The short arms of elbow lever 79' are pivoted to the weight 76', with slight play to allow for the change of length in their cosines when moving up or down. The long arms end in buttons entered in the left hand groove of the sleeve 80', whereby the latter is made to move to the left, closing the cock when the weight moves outwardly, and vice versa. Two links 81'' are suspended by two straps 82' from a stud 33. The right hand ends of the links 81'' are pivoted to the short forked ends of lever 84, and their left hand ends enter the right hand groove of sleeve 80', whereby they transmit the motion of the sleeve to the lever 84 which is pivoted in ears 85 Fig. 14 on box K. The long end of lever 84 transmits its motion by link 86 to the crank arm 87 attached to the spindle of cock 34.

The governor described, or any other suitable construction of speed governor, may be arranged to govern the motor either by throttling the passage of fluid through a channel (as 33) between the working cylinder and heating and cooling chamber; or by opening more or less a by-pass valve in a channel communicating from one side of the piston to the other, so as to reduce the differential or effective pressure tending to move the pistons, as set forth in my aforesaid Patent Number 623,137.

Having thus fully described my invention, what I claim is—

1. In a non-exhaust motor, a displacer adapted to rotate in the fluid-heating and cooling chamber of corresponding shape, whereby the displacer acts as a fly-wheel and gives centrifugal force to the fluid, causing it to strike the heating and cooling surfaces with impact, thereby increasing the efficiency and speed of the motor.

2. In a non-exhaust motor, a displacer having a depression or pocket in its periphery, and adapted to rotate in the corresponding fluid-chamber, substantially as described.

3. In a non-exhaust motor, a displacer adapted to rotate, a fluid-chamber formed of a relatively hot part, and of a relatively cold part, and an intervening construction obstructing the passage of heat from the hot to the cold part.

4. In a non-exhaust motor, a rotary displacer, a heating and cooling fluid chamber of corresponding shape so that the rotary displacer can utilize centrifugal force to throw the vapor or air contained therein against the walls of the chamber for heating and through an opening in the cylinder for doing work, a working cylinder opening directly into said fluid chamber, without intervening fluid channel, and a power piston in said cylinder adapted to work close to said fluid chamber.

5. In a non-exhaust motor, a rotary displacer, a corresponding heating and cooling chamber wherein the displacer is adapted to rotate, a working cylinder opening at one end directly into such chamber, a power-piston adapted to reciprocate in such cylinder, a crank-pin upon said displacer, and a rod connecting such crank-pin to the power-piston.

6. In a non-exhaust motor, a rotary displacer consisting of two parts divided transversely to its axis of rotation, a crank-pin firmly connecting the two parts a working cylinder opening directly into the chamber wherein the displacer is arranged to rotate, the power-piston, and a connecting rod joining said piston to said crank-pin.

7. In a non-exhaust motor, a divided rotary displacer, a crank-pin connecting the two parts of the displacer, a working piston, and a connecting rod joining the piston to said crank-pin, such rod being abnormally wide in the plane of rotation, and thin in its axial direction, whereby a minimum of dead space is obtained between the two sections of the displacer.

8. In a non-exhaust motor, a piston, a rotary displacer formed of two sections connected by a crank-pin, and a connecting rod coupled thereto formed with a sleeve embracing said crank-pin.

9. In a non-exhaust motor, a rotary displacer, a fluid-chamber of corresponding shape, wherein the said displacer is adapted to rotate whereby the displacer may throw fluids by centrifugal force against the walls of the fluid chamber, and a working cylinder opening directly into such chamber, the opposite end of such cylinder being closed against the atmosphere.

10. In a non-exhaust motor, a rotary displacer formed of concentric sections, the central section carrying the crank-pin, and the annular section being formed with a cut away portion for containing the active fluid, whereby the lead of such recess may be regulated.

11. In a non-exhaust motor, a rotary displacer formed of concentric sections, each section being rotatively balanced independently, so that an adjustment for lead will not disturb the rotative equilibrium of the displacer.

12. In a non-exhaust motor, a power-piston and its cylinder opening directly into the heating and cooling chamber, a displacer adapted to rotate in said chamber, a crank-pin upon said displacer, a connecting rod joining the said crank-pin to the power-piston, a piston-rod attached to the opposite end of said piston, and a pump piston attached to the other end of said piston-rod.

13. In a non-exhaust motor, the combination with a rotary displacer and its fluid-chamber, of a heat jacket on said chamber and heat pegs studding said jacket adapted to carry heat to the inside of the fluid chamber wall, whereby the rapid extraction of heat therefrom by the centrifugal impact, given to the fluid by the displacer, is provided for.

14. In a non-exhaust motor, the combination with a rotary displacer and its fluid chamber, of a cooling jacket to such chamber, and heat-pegs studding said jacket, adapted to convey heat from the inner wall of said chamber outwardly, whereby the capacity of such wall for absorbing heat from the working-fluid is increased to correspond to the increased speed of the motor obtained by the rotary motion of the displacer.

15. A non-exhaust motor adapted for producing power from a condensable fluid (as steam) comprising a heating and cooling chamber, a displacer therein, and a power piston, combined with means adapted to feed such fluid automatically into the motor to maintain a predetermined pressure thereto.

16. In a non-exhaust motor, a pressure regulating chamber, containing working fluid under an approximate predetermined pressure combined with means for automatically feeding such working fluid into the motor as required.

17. The combination with a non-exhaust motor comprising a working chamber, a displacer, and a power piston, of means for regulating the mean pressure therein, consisting of a source of fluid at approximately uniform pressure, and a passage communicating therefrom to said working chamber with an intervening valve adapted when the minimum pressure in said working chamber falls below said uniform pressure to permit an inflow of fluid.

18. In a non-exhaust motor, having a rotary displacer, a pressure regulating reservoir containing working fluid under an approximate predetermined pressure, together with automatic means adapted to feed such working fluid into the motor as required, substantially as described.

19. In a non-exhaust motor, two independent heating and cooling chambers, a displacer in each chamber, a double-acting power-piston with its cylinder, and a pressure regulating reservoir having means adapted to reinforce the respective pressures on both ends of the power-piston automatically.

20. In a non-exhaust motor having a rotary displacer, a pressure regulating reservoir, a flue arranged to carry heat to such reservoir, together with mechanism adapted to automatically feed the contents of such reservoir into the motor, substantially as described.

21. In a non-exhaust motor, a reservoir of working fluid, means for heating the same, and mechanism acted upon by such fluid, whereby the mean pressure in the motor is automatically regulated and maintained.

22. In a non-exhaust motor, a reservoir for supplying lost working fluid, a furnace for heating the motor, and a passage for directing fire-gases to heat the reservoir combined with an automatic pressure regulator for controlling the flow of the fire-gases through said passage by the pressure in the reservoir.

23. In a non-exhaust motor, a reservoir for supplying lost working fluid, a furnace for heating the motor and a passage for directing fire-gases to heat the reservoir, combined with a yielding diaphragm in communication with said reservoir, a lever vibrated by the movements of the diaphragm, and a damper in connection with said passage connected to the lever and adapted when moved thereby to deflect more or less fire-gases into contact with the reservoir.

24. In a non-exhaust motor, the combination with the heating and cooling chamber, of an automatic mechanism adapted to free said chamber of surplus liquid substantially as described.

25. In a non-exhaust motor, a displacer fixedly mounted upon a shaft, a heating and cooling chamber wherein the displacer is adapted to rotate, a heat obstructing construction intervening between the cool section and the hot section of said chamber, and bearings for said displacer shaft in the cool section of said chamber.

26. In a non-exhaust motor, the combination with the displacer and fluid chamber wherein it is adapted to rotate, such chamber being formed of a heating section and of a cooling section, with the displacer shaft bearings in the cooling section, of a curved joint between the two sections, whereby the heating surfaces on the sides may extend higher up than on the shaft bearing ends, thereby increasing the heating surface of the motor.

27. In a non-exhaust motor, a pressure regulating reservoir provided with an opening for filling the same, in combination with a cap for covering said opening, together with a spring or weight loading said cap, so as to serve as safety valve.

28. In a non-exhaust motor, the combination with a fluid heating and cooling chamber, a displacer therein, a working cylinder, a piston therein, a passage communicating between said chamber and the active part of said cylinder, and means for controlling the engine by choking the flow of working fluid contained in said chamber through said passage.

29. In a strictly non-exhaust motor in its cycle of operation, the combination of a fluid heating and cooling chamber, a displacer therein, a working cylinder, a piston therein, a passage communicating between said chamber and the active part of said cylinder, and a governing valve controlling the engine by choking the flow through said passage, combined with a centrifugal governor, and a mechanical connection between said governor and the governing valve.

30. In a non-exhaust motor, the combination with a fluid heating and cooling chamber, a displacer therein, a working cylinder, a piston therein, a passage communicating between said chamber and an active part of said cylinder, and a governing valve controlling the flow of fluid through said passage, combined with a flywheel governor having weights moving each in the plane of rotation, a sleeve movable parallel to the flywheel axis, interposed means for transmitting motion between the weights and sleeve, and a mechanical connection between said sleeve and the governing valve.

31. In a strictly non-exhaust motor, a governing valve controlling the flow of working fluid through a passage leading from its stationary heating and cooling chamber to the working piston, combined with a governor adapted to control said valve and thereby the speed of the motor.

32. In a non-exhaust motor, the combination with a working cylinder opening directly into the fluid heating and cooling chamber and its power piston coupled to the displacer arranged to rotate in said fluid-chamber together with an auxiliary fluid chamber and a corresponding displacer, of a fluid-channel from said auxiliary fluid-chamber into the outer end of said working cylinder, said channel being provided with a valve or cock whereby the current through such channel can be throttled and controlled and the speed of the motor regulated.

33. In a non-exhaust motor, a rotary displacer with a corresponding heating and cooling chamber, a working cylinder with its power piston, a channel connecting said chamber to one end of said cylinder, and a valve or cock in said channel adapted to throttle the current of fluid through the same, together with a speed governor coupled to said valve.

34. In a non-exhaust motor, a heating and cooling chamber, a displacer acting as a fly-wheel adapted to rotate in said chamber, a crankpin upon said displacer, shaft-ends fixedly attached in said displacer and bearings for the same, a working cylinder opening directly into such chamber, a power-piston in said cylinder, a connecting rod joining the piston to the said crank-pin, a piston rod mounted upon said piston and at the other end coupled to a pump-piston, and caps upon the ends of said shaft bearings, whereby the motor, after it is started, has no outside moving parts and is protected against leakage, dust and interference.

35. In a non-exhaust motor, a rotary displacer coated with enamel or other material obstructing the conduction and radiation of heat to and from the same.

36. A non-exhaust motor wherein a confined fluid is alternately heated and cooled, the heat being transmitted through an intervening shell or vessel, and its resulting expansion and contraction are utilized to drive a piston, the working fluid being a homogeneous mixture of considerable fluid (as steam) and a non-condensable fluid (as air), the relative quantity of steam exceeding the saturation capacity of the air, whereby the stability of the pressure is increased and too free a collapse is prevented.

37. A non-exhaust motor wherein a confined fluid is alternately heated and cooled, and its resulting expansion and contraction are utilized to drive a piston, the working fluid being a homogeneous mixture of condensable fluid (as steam) and a noncondensable fluid (as air) the mixtures being accomplished by the mechanical means substantially as shown and described.

38. In a non-exhaust motor, having a fluid heating and cooling chamber, a lubricating reservoir having an opening from its upper part into the fluid heating and cooling chamber, and an opening from its lower part into a chamber encircling the shaft in its bearing together with coiled corrugated wire or porous material lodged in said chamber, around the shaft, and adapted to keep the adjacent bearing sleeves separated and to give to the lubricating fluid access to the shaft; whereby said fluid forms a stuffing-box sealed thereby against escape of the working fluid.

39. In a non-exhaust motor, having a fluid and cooling chamber, a lubricating reservoir having an opening from its lower part into a chamber encircling the shaft in its bearing, together with perforated or porous bushing adapted to keep the adjacent bearing pieces apart and to give to the lubricating fluid access to the shaft, in combination with packing at the end of the bearing, preventing a lubricating fluid from escaping endwise, and forming a stuffing-box sealed thereby against the escape of the working-fluid.

40. In a non-exhaust motor, the combination, with a cylindrical heating and cooling chamber of a displacer adapted for continuous revolution therein formed with a working fluid cavity upon its periphery, and with working fluid cavities upon its ends communicating with said cavity substantially as described.

41. In a non-exhaust motor, a rotary displacer a heating and cooling chamber of corresponding shape, a shaft attached to said displacer, bearings for the same in the shell of said chamber, together with a sleeve of heat obstructing material surrounding such bearing.

42. In a non-exhaust motor, a heating and cooling chamber, a displacer adapted to rotate therein, a fluid space, said displacer arranged with "lead" over the power piston and mechanism whereby such lead is maintained when the motor is reversed, as the lead of a valve eccentric of a steam-engine is maintained when the engine is reversed.

43. In a non-exhaust motor a rotary displacer constructed of concentric sections, the outer of which is formed with a fluid recess and is adapted to be rotatively displaced upon the inner section, with stops on said section to limit such displacement to the angular difference between the lead regulated for such recess in running forward and that required in the running backward.

44. In a non-exhaust motor, a heating and cooling chamber, a displacer adapted to shift the working fluid, a power-piston operated by the change of pressure in said chamber in combination with a working fluid admixed with lubricating material, whereby the motor's efficiency and durability is increased.

45. In a non-exhaust motor, a heating and cooling chamber, a displacer adapted to shift the working fluid therein, and a power piston with its cylinder opening directly into said chamber, with a connecting rod from the piston to the displacer adapted to rotate the same, in combination with a lubricating material admixed with the working fluid; whereby inside connection of the working parts is made practicable.

46. In a non-exhaust motor, a rotary displacer, a heating and cooling chamber wherein the displacer is adapted to rotate, a working cylinder opening directly into such chamber, a power piston in such cylinder, a crank-pin upon said displacer, a wrist-pin incorporated in said piston, and a connecting-rod joining said crank-pin to said wrist-pin.

47. In a non-exhaust motor, a rotary displacer, a corresponding heating and cooling chamber, a working cylinder opening directly into such chamber, and its piston coupled to said displacer, in combination with a wrist-pin incorporated in said piston, consisting of a main or core piece to which the connecting-rod is fixedly attached, and a sleeve fitted upon the reduced end of the core piece, and a means for causing such sleeve to move in unison with said core-piece.

48. In a non-exhaust motor, a rotary displacer, and a heating and cooling chamber wherein the displacer is adapted to rotate, the displacer constructed with a recess on one side to contain working fluid, and formed of greater weight on the recessed side to rotatively balance it.

49. In a machine of the class specified means for heating an expansive fluid, rotary means for shifting said fluid, and means for allowing said fluid to expand and do work and then return said fluid to its original volume to said rotating means; so that said fluid, is first heated, then expanded, and cooled, then compressed while cool and returned to the heater.

50. In a machine of the class specified, a closed vessel containing an expansive fluid, means for heating said fluid, a rotary displacer in said vessel, a piston in the vessel having fluid passages in communication with said displacer and means in said displacer for shifting the fluid between the heater and piston whereby the same fluid is used repeatedly and at each cycle of the machine.

ROBERT CREUZBAUR.

Witnesses:
  John B. Suydam,
  Aug. D. Kelsey.